US 6,697,951 B1

(12) United States Patent
Sinha et al.

(10) Patent No.: US 6,697,951 B1
(45) Date of Patent: Feb. 24, 2004

(54) DISTRIBUTED ELECTRICAL POWER MANAGEMENT SYSTEM FOR SELECTING REMOTE OR LOCAL POWER GENERATORS

(75) Inventors: Gautam Sinha, Clifton Park, NY (US); James P. Lyons, Niskayawa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/559,420

(22) Filed: Apr. 26, 2000

(51) Int. Cl.[7] .................................................. G06F 1/26
(52) U.S. Cl. ........................ 713/300; 705/412; 700/286
(58) Field of Search .......................... 713/300; 700/286, 700/296, 295; 705/412

(56) References Cited

U.S. PATENT DOCUMENTS

| | | | | |
|---|---|---|---|---|
| 5,237,507 A | * | 8/1993 | Chasek .......................... 705/412 |
| 5,404,136 A | * | 4/1995 | Marsden ................. 340/870.03 |
| 5,761,083 A | * | 6/1998 | Brown et al. ................ 700/296 |
| 5,930,773 A | | 7/1999 | Crooks et al. |
| 5,974,403 A | | 10/1999 | Takriti et al. |
| 6,021,402 A | | 2/2000 | Takriti |
| 6,047,274 A | * | 4/2000 | Johnson et al. .............. 705/412 |
| 6,115,698 A | * | 9/2000 | Tuck et al. ..................... 705/37 |
| 6,178,362 B1 | * | 1/2001 | Woolard et al. ............. 700/295 |
| 6,216,956 B1 | * | 4/2001 | Ehlers et al. .................. 236/47 |
| 6,487,457 B1 | * | 11/2002 | Hull et al. ...................... 700/17 |
| 6,529,839 B1 | * | 3/2003 | Uggerod et al. ............... 702/61 |

OTHER PUBLICATIONS

M–S Yen et al., "Time–of–Day Electricity Pricing Using Optimal Mix of Generation System", 1988, pp. 5.28.1–5.28.7.*
Comprehensive Power Management Software (1 page).
Capstone Micro Turbine™ (2 pages).
Electricity Technology Roadmap, Jul. 1999 (pp. 1–50).

* cited by examiner

*Primary Examiner*—Dennis M. Butler
*Assistant Examiner*—Chun Cao

(57) ABSTRACT

Computer based energy service provider (ESP) information service has been developed for providing operational and management services for distributed local power generation units. The ESP is a subscription service for customers that purchase power from utilities and generate their own power on site from a local power generation unit. The ESP service enables those customers to decide when to purchase power from the utility or generate their own power, and may provide control of the customer's power generation unit. Using the ESP, a customer may select whether to exclusively purchase power from a utility, exclusively generate its own power or allow the ESP service to determine whether power should be purchased or self-generated. The ESP service stores the customer's selections and remotely controls and operates the local power generation unit and a switch which connects the customer site alternatively to a utility power source or the power generation service.

13 Claims, 4 Drawing Sheets

DISTRIBUTED ELECTRICAL POWER MANAGEMENT SYSTEM FOR SELECTING REMOTE OR LOCAL POWER GENERATORS

BACKGROUND OF THE INVENTION

1. Field of the Invention

This invention generally relates to the management of distributed and independent power generators. More particularly, the invention relates to a power generation network having a computer management system in communication with many otherwise independent power generators.

2. Related Art

Power generation is shifting from centralized generation of electricity by utility companies to a distributed power generation in which utilities and some of their customers generate power for a distributed network of customers and power suppliers. Power has traditionally been generated by central utilities that distribute generated power over a power grid to their customers. In the past, these customers have been purchasers of power from the utilities, and have not generated their own power or sold power over the power grid. Accordingly, the generation of power has been traditionally centralized.

In recent years, customers of the utilities have begun to produce their own power using small power generation units that are relatively inexpensive and easy to operate. These small units provide locally generated power at costs comparable to the cost of electricity purchased from utilities. By installing small power generation units at their sites, e.g., office buildings, small factories and retail store sites, customers provide themselves with an alternative source of power that is, in principle, independent of the power utility companies. The small power generation units are purchased for a variety of reasons, including to serve as a back-up power source, a power source when only reduced power, referred to as a brown-out, is being provided by the utilities, and as a primary power source. Customers with their power generation units typically continue to purchase power from the power utilities and use their local power generation units as another power system. The growing presence of power generation units at customer sites is shifting the conventional centralized power generation system to a distributed system having both large power generation utilities and small, distributed power generation units.

Local power generation units are usually operated and controlled by the site at which they are located. The sites are office buildings, retail malls and small factories. At these sites, the individuals operating local power generation units may be building maintenance personnel who have many responsibilities in addition to operating the power generation unit. These individuals responsible for these power generation units may not be familiar power generation units, as most sites are not primarily power generation sites. In addition, these individuals may not have ready access to information regarding the costs of utility supplied power, the cost of power generated on site, the price that utilities will pay for power, and other information that is relevant to the operation of a local power generator. Accordingly, there is a need for a power information service that provides ready access to information relevant to the operation of a local power generation unit. Moreover, the individuals who operate local power generation units may not regularly monitor information relevant to power generation, even if that information were readily available. Accordingly, there is also a need for an automated service for operating local power generation units.

The power generation units are sophisticated systems. Information pertaining to the operating "health" of these systems would be useful to a monitoring system and a utility company.

SUMMARY OF THE INVENTION

A method and system has been developed for providing information regarding local power generation, and for managing distributed loads and sources of electrical power. A power generation information service is provided to those utility customers who purchase power from power utility services and have local power generation units. The information service tracks the power consumption by the customers, the cost of generating power on-site with the customer's local power generation unit, and the cost of purchasing power from a utility. The service provides information to better enable customers to decide: (i) whether and when to purchase power from a utility or to generate their own power, (ii) whether and when to generate power for sale to the utility, and (iii) whether to perform maintenance on their power generation unit. In addition, the power information service can determine when the customer should purchase, generate or sell power, using an algorithm for determining whether to generate power locally and to use the power at the site and/or sell the generated power. This algorithm includes parameters and conditions specified by the customer for operation of its power generation unit. Accordingly, the information service may automatically manage a customer's power usage and generation in a manner that best matches the customer's needs and preferences.

The power information service may also convey information regarding the local generation units to the power distribution system and to the utilities. Such information may be useful to safe and reliable operation of the overall power grid.

These and other features and benefits of the present invention will be more fully understood by careful study of the following more detailed description of preferred exemplary embodiments of the invention.

BRIEF DESCRIPTION OF THE DRAWINGS

The accompanying drawings, which are incorporated in and constitute a part of the specification, illustrate various exemplary embodiments of the present invention and, together with the general description given above and the detailed description provided below, serve to explain the principles of the invention.

DETAILED DESCRIPTION OF PREFERRED EXEMPLARY EMBODIMENT

Figure 1:
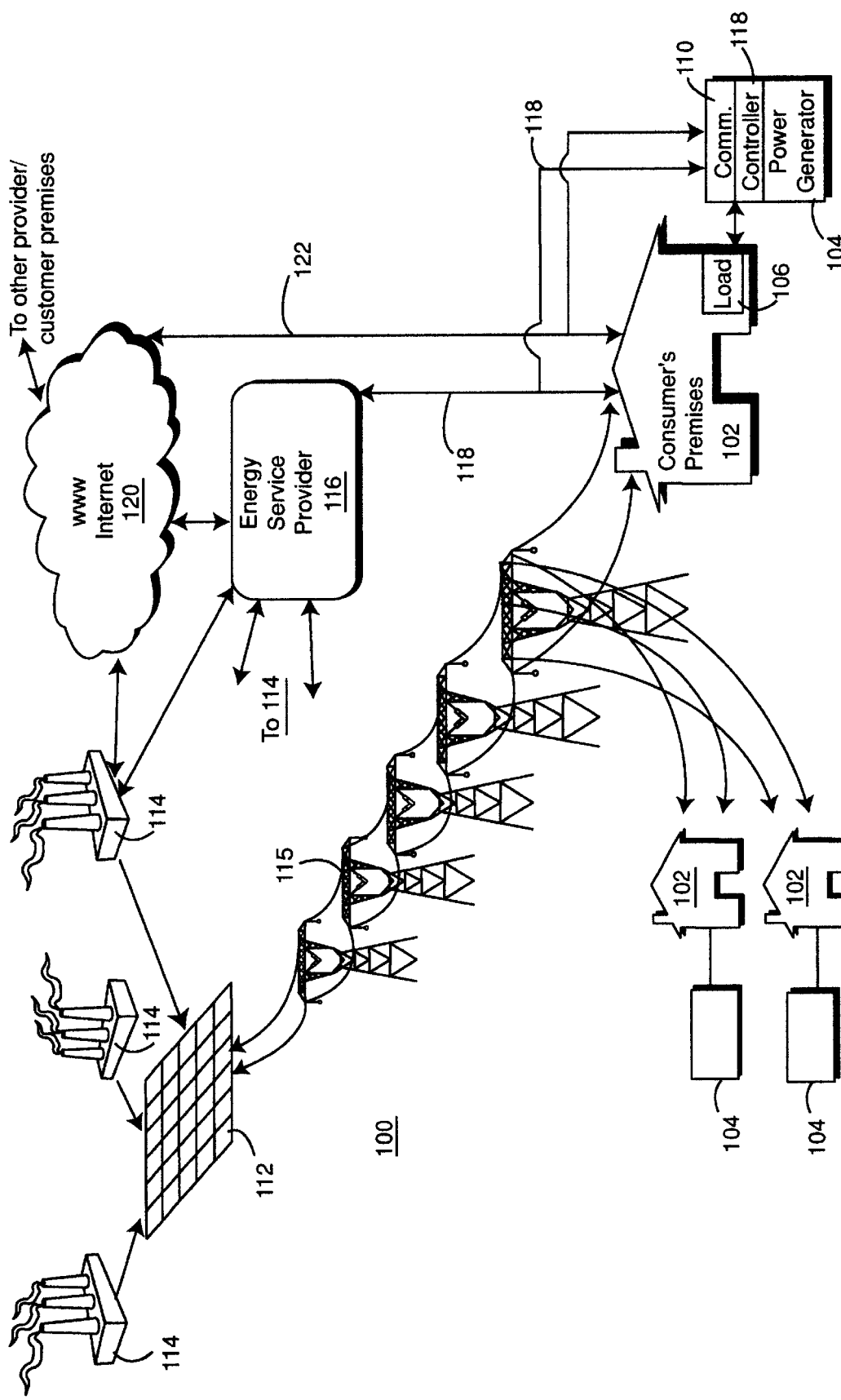
FIG. 1 is a general diagram of a distributed network of power utilities and utility customers having local power generation units.

FIG. 1 is a schematic diagram of a distributed electrical power generation and load management network 100. Each local site 102 in the network includes a local power generation unit 104; a power load 106 which may be an office building, retail store or factory that consumes power; a power generator controller 108, and a site computer communication unit 110, e.g., a modem. The network may include conventional local sites (not shown) that have a power load, but no power generation facility. The sites 102 are connected to a power distribution grid 112 which provides power to the sites that have been generated by central power utilities 114. The grid 112 includes transmission lines 115 that connect each customer site to their utility.

The local site 102 may be an office or apartment building, retail store or mall, a factory or virtually any other site that has a local power generation unit that is primarily used to provide power to that site. The local site need not be confined to one building, but may be a group of buildings, such as in an office park, a university, or a factory site; a small community, such as a mobile trailer park, neighborhood of homes, or small town, or a government facility, such as a military base, research center or police fire unit. For purposes of the present invention, the local site need only have a local power unit which is generally intended to provide power to a power load at the site.

In addition, customer sites 102 may be connected to an Energy Service Provider (ESP) 116 that provides energy management services to those sites subscribing to the service. An ESP information service is provided to power consumption customers who both purchase power from power utility services and have local power generation units. The ESP information service tracks the power consumption by the customers, the cost of generating power on-site with the customer's local power generation unit, and the cost of purchasing power from a utility. The ESP service provides information to better enable its customers to decide: (i) whether to purchase power from a utility or to generate their own power, and (ii) whether to generate power for sale to the utility.

In addition, the ESP information service may determine when the customer should purchase, generate or sell power, using a prescription for power usage and generation that the customer has selected. The information service may automatically manage a customer's power usage and generation in a manner that best matches the customer's needs. In particular, the power generation unit at each site can generate power for its own office building/retail store/factory; generate power to be injected in the public power grid and sold (such as to a utility), turned off so that it does not generate power, and some combination of the three states. The power information service may remotely control each power generation unit at each site in the network.

The local power generation units 104 may be a fuel cell, micro-turbine, or other type of distributed power generator (DPG). A DPG is distributed power generation unit in the sense that it is located at the site 102 of a power load 106 and is not at a power utility 114. A fuel cell generates electricity by reactions using hydrogen ions, drawn from a hydrogen-containing fuel oxygen. Small micro-turbine power generation units are another example of a DPG 104. A micro-turbine provides a local source of electric power, that is independent of the electric utilities. A micro-turbine may have a simple, single moving shaft supporting a compressor, turbine and rotor. Fuel cells and micro-turbines allow for low technical skill maintenance and low overall operating costs for local power generation.

At sites 102 having a local power generation unit (DPG) 104, the customer who is responsible for the site may purchase power from the utilities 114, or generate power from their DPG. Accordingly, the customers must decide on a continuing basis whether to purchase power from a utility or generate power from their DPG. This decision to select a power source may be one that the customer was not making prior to installing a DPG, and may be a decision for which the customer needs additional information about the relative cost of utility supplied power and DPG power. Moreover, this power source decision can be complex in that the customer may also have the option of purchasing power from more than one utility and selling power generated by its DPG to utilities. The ESP 116 provides information and control services to assist customers in determining whether to purchase power from a utility, generate power for their own local site or sell power to the utility.

The ESP 116 may be electronically linked to each site 102 via a direct data connection 118, e.g., a modem telephone or cable line or a wireless communication medium, that provides a duplex data connection to a site computer system and/or a controller on the site power generation unit 104. In addition (or alternatively), the ESP may be indirectly connected to the site via the Internet 120 to which the site connects via a modem connection 122. The Internet connection may be used as a back-up or redundant communication path between the ESP 116 and site 102 for use when a direct-dial connection is not available or impractical. These electronic links between the ESP and the site allow the ESP to provide power generation information to the site and to control the operation of the local power generation DPG unit at the site. Moreover, the ESP service may also have data links to the power in utilities 114 so that the service 116 can obtain power rate (cost) information from the utilities, and broker the sale to the utilities of power generated by the DPGs.

Figure 2:
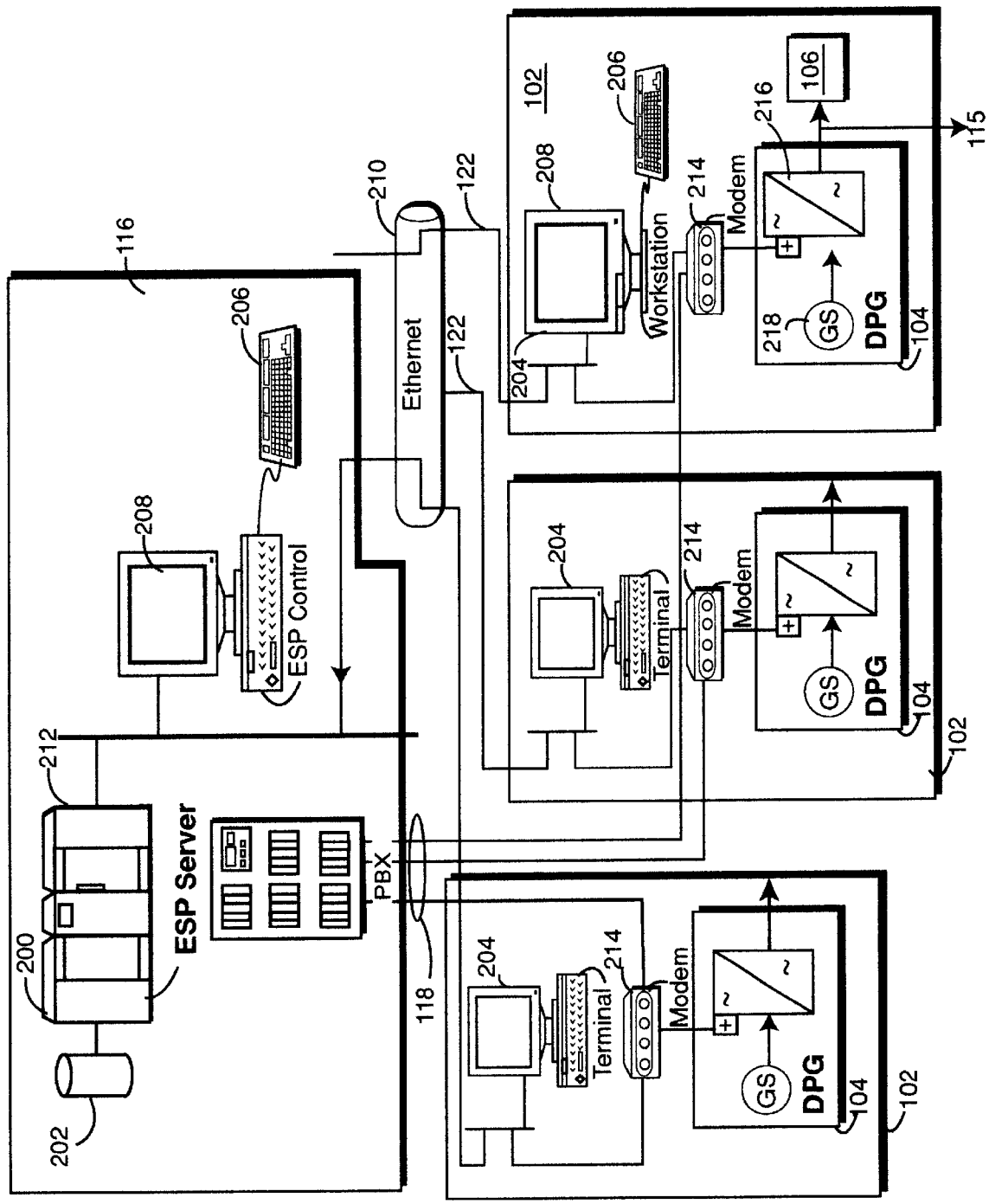
FIG. 2 is block diagram of an exemplary distributed network of local power generation units and a power generation information system, which is a subset of the network disclosed in FIG. 1.

As shown in FIG. 2, the ESP 116 may include a central computer system (or network of computer systems) 200 that provides energy related information to the sites 102 and may control the operation of the local power generation DPG unit 106 at the site. The computer system 200 may be a server computer (e.g., a mainframe computer, mini-computer or personal computer) that has access to a database(s) 202 of energy related information. The type of energy information provided on the ESP database may include existing energy tariffs for power purchased from one or more utilities; information regarding the operation and performance of various models and makes of DPGs; information regarding he performance and maintenance of individual DPGs at sites; estimated costs of generating power by local power units, and the customer's current and historical power consumption requirements.

More particularly, the databases 202 may store information regarding: the power purchased from the utilities; the price that the utilities will pay for power generated by the customer; the customer's current and historical power consumption requirements; the power generation capacity of the customers; the cost to the customer to generate power; the conditions under which the customer desires to purchase, generate and sell power; and other information pertinent to the customer's power consumption needs and power generation capacity. Alternatively, the ESP information service may access some or all of this information from remote databases, such as utility power costs that are obtained from databases maintained by the utilities 114. In addition, the central computer system 200 may include executable software programs having algorithms which determine when a customer should purchase, generate and sell power, based on the current costs for power, the customer's demand for power and the conditions that the customer has prescribed for buying, generating and purchasing power. In addition, the computer system 200 may include a controller that executes control algorithms to operate the power generation DPG unit 104 at each site via a communication link 118.

In addition, the ESP computer system 200 may automatically control the local power generation unit 104 of a customer. The information service 116 may connect to a controller on each customer's power generation unit and power consumption meter (see load 106) in order to monitor local power usage and to control local power generation for each site 104. The information service 116 tracks the customer's power usage, and determines whether the customer should purchase power, generate its own power, or sell power. In view of these determinations, the information service sends control signals to operate the local power generation unit of the customer.

The computer system 200 for the ESP service and the computers 204 at each site (which may each comprise computer workstations or controllers, for example) may each include a data processing unit and a memory. In each computer system 200 and computer 204, a system bus may couple various computer components including memory to the processing unit. A number of program modules may be stored in memory, including an operating system, one or more application programs, other program modules, and program data. A user may enter commands and information into computer system through input devices such as a keyboard 206 and pointing device (e.g., a "mouse"). Other input devices may include a microphone, joystick, game or other manually-operated controller, satellite dish, scanner, or the like. These and other input devices are often connected to processing unit through a serial port interface that is coupled to system bus, but may be connected by other interfaces, such as a parallel port, game port or a universal serial bus (USB). A display monitor 208 or other type of display device is also typically connected to system bus via a switchable interface, such as a video adapter. In addition to the monitor, computer system will typically include other peripheral output devices, such as speakers and printers. The ESP computer system 200 may operate in a networked environment, e.g., an Ethernet network 210, using logical connections to one or more remote computers, such as the site computer workstations 204. In one embodiment, the ESP computer system additionally has a dial-up modem telephone connection 118 through a private branch telephone exchange (PBX) 212 to establish modem 214 connections to the controller 216 for a DPG 218 at a site 102. The modem 214 for the DPG controller 216 may be dialed directly by the ESP 116 via a direct link 118 or indirectly via the Internet and the site workstation 204. Regardless of the data path, the ESP may access the modem 214 to control the operation of the DPG.

Figure 3:
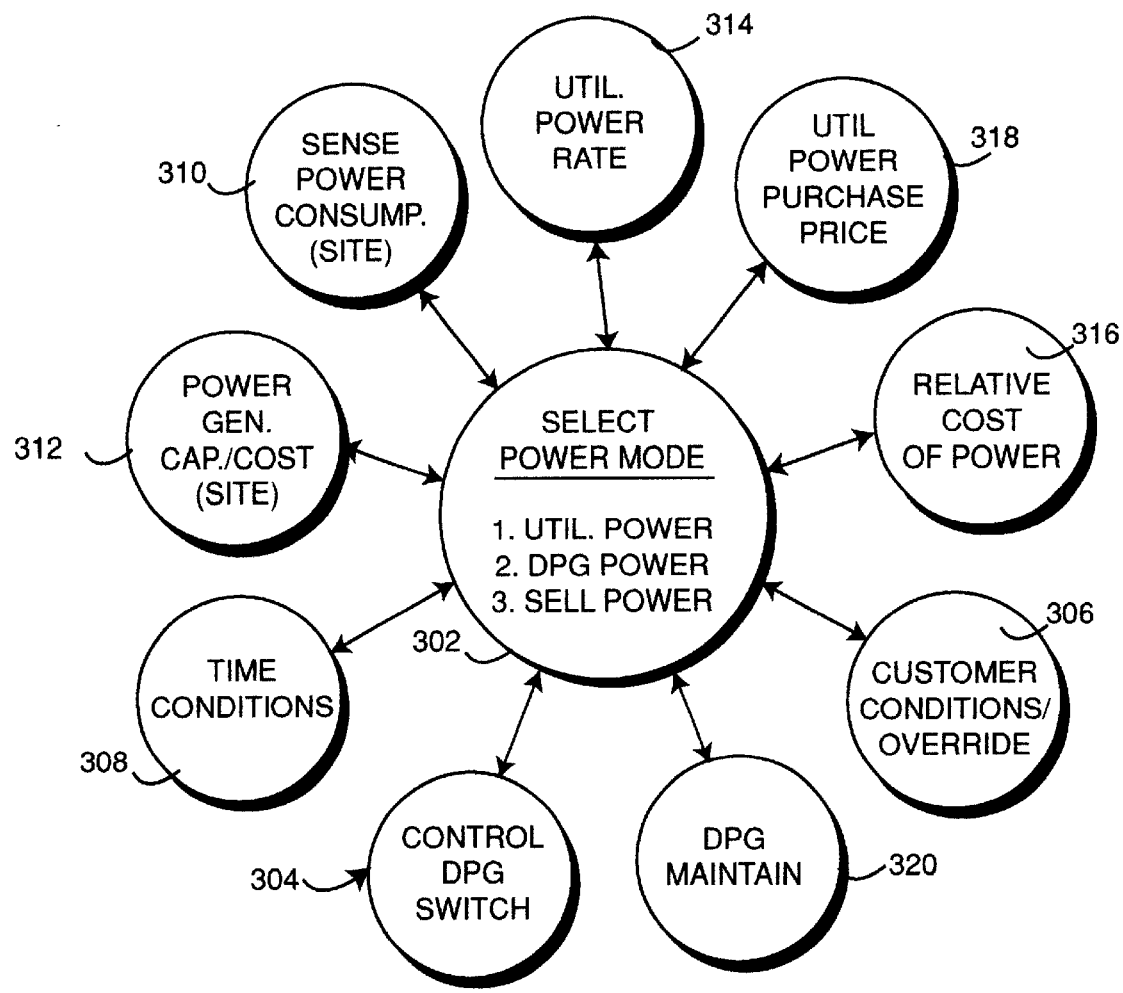
FIG. 3 is a state diagram showing the operation of the power generation information system shown in FIG. 2, and FIG. 4 an exemplary screen image displayed on a local control computer.

A simple example of a control algorithm executed by the ESP computer system with respect to a DPG is shown in the state diagram of FIG. 3. The state diagram shown in FIG. 3 illustrates the various computational states which the ESP computer system 202 may go through to manage and control a DPG at an individual customer site 102. The ESP computer system performs these computational states for each customer and the customer's DPGs. In state 302, the ESP system selects a power operational mode which controls a DPG switch 216 (shown in FIG. 2). The switch setting determines whether power to the site is drawn from the utilities or the DPG power generator, in state 304. The determination by the ESP service of a selected power mode for each DPG is made based on a number of parameters. In state 306, the customer can specify certain conditions that dictate the power mode for the DPG and override any determination made by the ESP service. For example, the customer can dictate that for a certain period of time, e.g., a day, a week, or a month (see state 308), the DPG unit is to be turned off and all power is to be purchased from the power utility. Where the customer selects a utility mode, the ESP system sends a control signal to the DPG switch 216 that connects the power load 106 for the site 102 to the transmission lines 115 to draw power from the power utility 114. Similarly, the customer can dictate that all power for the power load 106 is to be provided by the DPG. Consequently, the ESP service controls the DPG switch 216 to activate the DPG and route power generated by the DPG 104 to the power load 106. Where the customer dictates the power source, the ESP service merely provides information to the customer regarding power consumption, power generation costs and utility power costs. This information allows the customer to make an informed decision dictating to the ESP a selected power mode for the customer site.

The customer may allow the ESP to determine the operating state of the DPG, in state 306. The ESP, in state 302, will then make an automatic decision as to whether the customer site 102 is to purchase power from the utility, generate power locally with the DPG and/or sell power generated by the DPG to the utilities. To make an automatic decision as to the appropriate power mode, the ESP system executes algorithms which determine the appropriate power generation mode for the site. Before executing the algorithm, the ESP system obtains information relevant to the power mode selection. The ESP system determines the power consumption rate of the site, in state 310. This power consumption information may be both current power consumption and historical power consumption for the site. The historical power consumption for the site may be stored in databases at the site and/or associated with the ESP computer system. In addition, the cost of generating power and the capacity of the DPG for a site is determined by the ESP, in state 312. To determine the cost of DPG generated power, the DPS may access its database to determine the make and model of DPG at the site, the fuel type used by the DPG, the cost of fuel and power rating for the DPG. The ESP service may match the capacity of the DPG power generator at the site with the amount of power consumed by the power load 106 for the site. If the DPG is unable to supply all of the power demand from the load 106, the ESP may determine that power should be purchased exclusively from a utility (and thereby avoid costs of operating the DPG) or that the DPG will generate part of the power for the power load and additional power is to be purchased from utility services.

In addition, the ESP may track the rates charged by utilities for power supplied to sites, in state 314. By comparing the cost of power purchased from one or more utilities to the cost of power generated by a DPG, the ESP may make an economic selection as to whether power for a site should be purchased from a utilities or generated on-site by the DPG. This relative cost determination may be made, in state 316, by the ESP pursuant to an algorithm comparing relative costs of power and in view of power generation parameters selected by the customer.

Moreover, the ESP service may perform other services such as determining whether the DPG may economically generate excess power not, needed by the site for sale to utilities via transmission lines and the distribution grid, in state 318. The ESP may also monitor the operational state of the DPG, such as by monitoring sensors that detect the fuel consumption, power output, turbine inlet and/or outlet temperature, compressor inlet and/or output pressure and temperature and other DPG conditions. With this information regarding the operation state of the DPG, the ESP service may send messages to the site requesting that maintenance be conducted on the DPG and/or automatically order maintenance personnel to attend to the DPG, in state 320.

Figure 4:
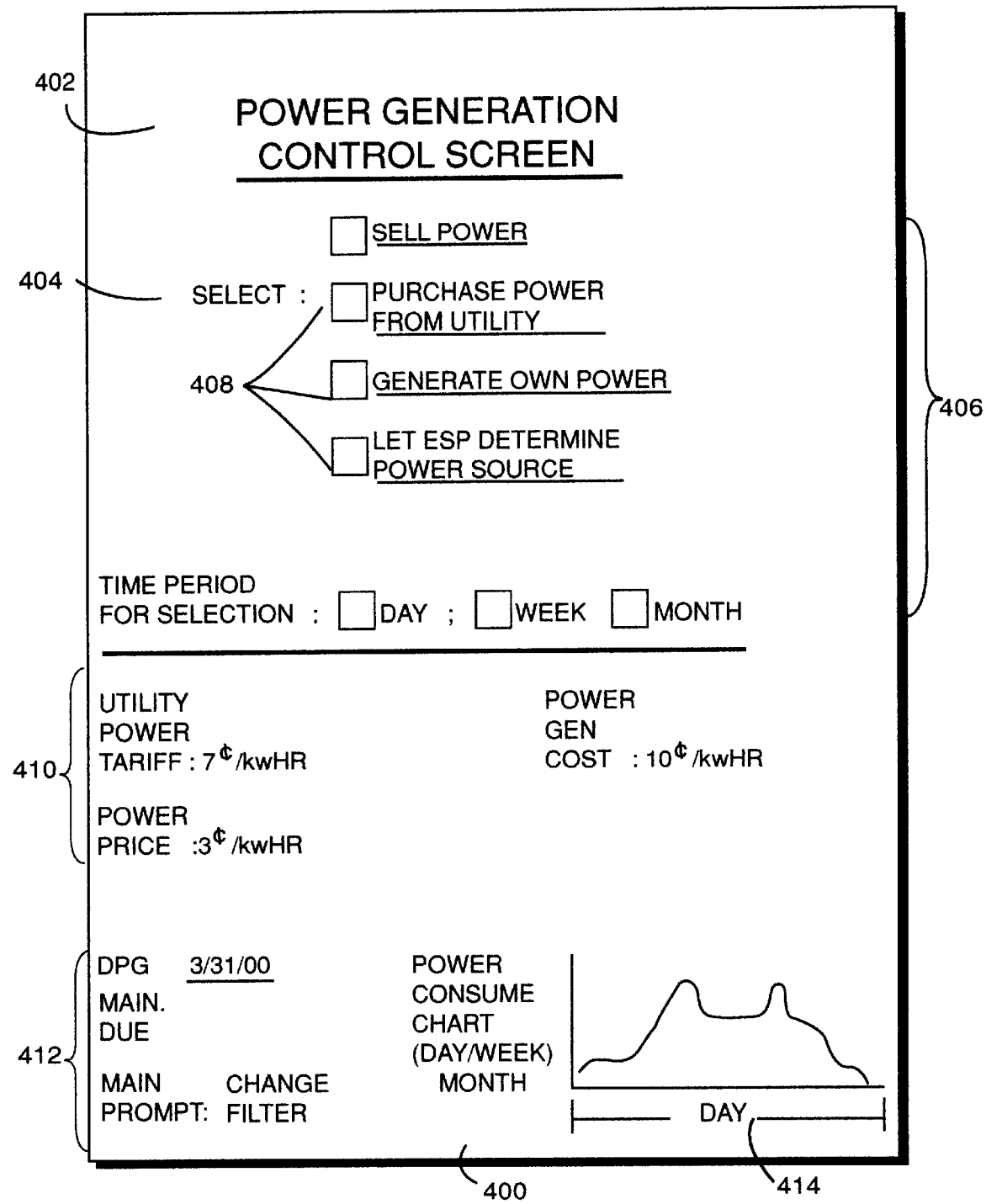

The customer elects the conditions under which its DPG is operated and utility power is purchased for its site 102 by entering the customer's preferences into an ESP control form displayed on a computer screen, such as is shown in FIG. 4. FIG. 4 shows an exemplary screen display image 400 presented on the display 208 of a customer's workstation 204 (shown in FIG. 2). The customer interacts with the screen 400 using the input devices 206 to the customer workstation to make selections of the options posed on the power generation control screen 400. The power generation control screen 400 is generated by client software application executed on the customer's workstation 204. The client software application operates in conjunction with the ESP server software that runs on the ESP server 200. Alternatively, the ESP client application on the customer's workstation may be replaced by (or backed up by) a web site operated on the ESP server which the customer interacts with via a web browser software application operating on the customer's workstation 204 to access the web site on the ESP server. This web site on the ESP server may include screen displays that enable a customer to select the conditions for power generation and purchase for its site 102.

The power generation selection screen 400 enables customers to select the power supply to their site such that power is purchased from utilities, generated by their DPG for their own use or for resale to the utilities under conditions prescribed by the customer. The screen 400 may include a header section 402 that identifies the screen as associated with the ESP system. Beneath the header may be a series of power mode options 404 that enable the customer to select the power source for its site. These options may include selections 406 to sell power generated by the DPG to power utilities; purchase power from power utilities and thereby not operate the DPG; generate power from the DPG for powering the power load 106 at the site, and enable the ESP service to determine which power source, e.g., utilities or DPG, should supply the power load 106.

The customer may select one of these options by moving a screen pointer to an appropriate selection box 408 and clicking on the box with a mouse 206 associated with the workstation. In addition, the user may select a time period applicable to the selection of the power mode. This time period, 410, may be for a day, a week, a month or another period selected by the customer. During this selected time period, the power mode the customer has selected, 406, remains operative. Once the time period expires, the ESP server may send an email message to the customer's workstation to remind the customer to select a power mode 408 for the next time period.

The power generation control screen 400 may also present power information 410 such as utility power costs, costs to generate power from the DPG and the price utilities will pay for power sold by customers back to utilities. In addition, the power generation control screen may present information 412 for maintaining the DPG such as a date by which a service personnel should maintain the unit and a suggested maintenance action for the DPG, e.g., change air/fuel filter. The maintenance information 412 may be generated by the ESP server based on a database information regarding the model DPG used at the customer site, the maintenance records of the particular DPG at the customer site, and data obtained from sensors monitoring the DPG. The ESP server may execute an algorithm which determines which maintenance should be scheduled for the DPG and proposes particular maintenance actions for a particular model DPG and in view of the particular maintenance records and data on the performance of the DPG that has been stored in the ESP databases. Furthermore, the power generation control screen 400 may present information regarding the power consumption by the power load 106 for the customer site. For example, the screen may show a chart 414 that shows the power consumption of the site's power load for the last day, week or month.

While particular exemplary embodiments of the present invention have been described and illustrated, it should be understood that the invention is not limited to the disclosed exemplary embodiments. Modifications and variations may be made by persons skilled in the art while still retaining some or all of the advantages of this invention. The present invention is intended to include any and all such modifications within the spirit and scope of the following claims.

What is claimed is:

1. A method of managing a distributed network of sites each having a local power generation unit using an energy service provider comprising:

selectively providing power to each site from the local power generation unit at the site and from a power utility, wherein each site includes a power mode switch connecting a power load at the site to the local power generation unit and to the power utility;

establishing a data communication link between a computer at each site and a computer system for the energy service provider;

inputting power mode instructions from a local computer system at each site and transmitting the instructions to the energy service provider, wherein the instructions dictate conditions for operating the local power generation unit and switching the site between the local power generation unit and power utility; and remotely operating the power mode switch in accordance with instructions from the site to automatically select power for each site power from one or both the local power generation unit and the power utility.

2. A method as in claim 1 wherein the step of automatically selecting power for each site includes determining whether the local power generation unit has a capacity to supply all power needed by the site.

3. A method as in claim 1 wherein the power is electric power.

4. A method as in claim 1 wherein the step of automatically selecting power for each site is performed periodically at regular time intervals specified by the customer for each said site.

5. A method as in claim 1 further comprising remotely operating the power mode switch to connect the local power generation unit to a power utility, and supplying power from the local power generation unit to the power utility.

6. A method for remotely controlling the supply of power to a plurality of consumers each of which is selectively connectable to one of first and second power sources and the second power source is a distributed power generator at a site of the customer, said method comprising:

providing a power generation information service having customer subscribers who have selected an automatic selection power source mode option provided by the service wherein each customer subscriber selects a predetermined value to be applied in selecting between the first and second power sources;

monitoring by the service the cost of power supplied for a first power source; and connecting a customer subscriber to the second power source and activating the second power source, if the cost of power from the first power source exceeds the predetermined value selected by the customer subscriber, and if the customer subscriber has selected an automatic selection option.

7. A method as in claim 6 comprising the further step of the customer inputting a power source mode selection from a group of options including the automatic selection power source mode.

8. A method as in claim 6 wherein the distributed power generator is selected from a group consisting of fuel cells and micro-turbine-powered generators.

9. A method for remotely controlling the supply of power to a plurality of consumers each of which is selectively connectable to one of first and second power sources and the second power source is a distributed power generator at a site of the customer, said method comprising:

providing a power generation information service having customer subscribers who have selected an automatic selection power source mode option provided by the service wherein each customer subscriber selects a predetermined value to be applied in selecting between the first and second power sources;

monitoring by the service the cost of power supplied for a first power source; and connecting a customer subscriber to the second power source and activating the second power source, if the cost of power from the first power source exceeds the predetermined value selected by the customer subscriber, and if the customer subscriber has selected an automatic selection option supplying power from the second power source to the first power source if a price paid for power supplied from the second power source exceeds a predetermined value.

10. A system for controlling the supply of power to a plurality of consumers each of whom is selectively connectable to a utility and a local power generation unit, the system comprising:

a central monitor for monitoring the amount of power demand by a consumer;

switches responsive to signals from the central monitor for connecting the consumer to their local power generation unit if the cost of power from the utility exceeds a cost of generating power by the local power generation unit and a customer has selected automatic power selection; and a local power mode selection device at a customer site and receiving automatic power selection input from the customer.

11. A system as in claim 9 wherein the switch is located at a site with the local power generation unit.

12. A system as in claim 11 wherein the local power generators are selected from the group consisting of fuel cells and micro-turbine-powered generators.

13. A system as in claim 9 wherein the first power source is an electric utility.

* * * * *